Figure 1:
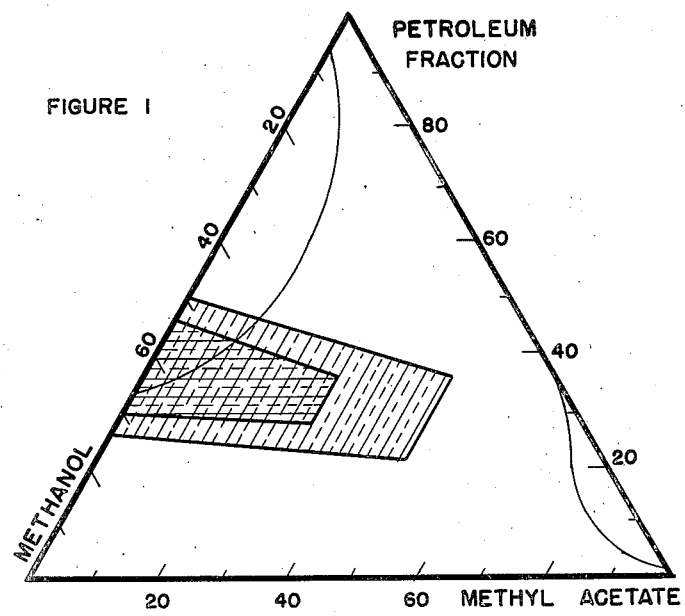

April 4, 1950     L. M. GERMAIN     2,502,715
PROCESS FOR THE PRODUCTION OF POLYVINYL
ALCOHOL BY ALKALINE ALCOHOLYSIS
Filed Feb. 24, 1948

INVENTOR

Leo M. Germain

Patented Apr. 4, 1950

2,502,715

UNITED STATES PATENT OFFICE 2,502,715

PROCESS FOR THE PRODUCTION OF POLYVINYL ALCOHOL BY ALKALINE ALCOHOLYSIS

Leo M. Germain, Shawinigan Falls, Quebec, Canada, assignor to Shawinigan Chemicals Limited, Montreal, Quebec, Canada, a corporation of Canada Application February 24, 1948, Serial No. 10,411

18 Claims. (Cl. 260—91.3)

This invention relates to the preparation of polyvinyl alcohol and to batch and continuous processes for the production of the same.

Objects

It is an object of this invention to provide a simple process for the production of polyvinyl alcohol from polyvinyl esters of lower aliphatic carboxylic acids. It is another object of this invention to provide a process which can be adapted to the continuous production of polyvinyl alcohol, whereby the advantages of continuous operation are obtained. It is a further object of this invention to provide a process for making polyvinyl alcohol by alcoholysis of polyvinyl esters of lower aliphatic carboxylic acids far more rapidly than has heretofore been possible. Other objects and advantages of the invention will be apparent from the ensuing description thereof.

Prior art

A number of methods of preparing polyvinyl alcohol have been developed to the present date, but all such processes have been batch processes, and none have achieved the benefits to be obtained by continuous operation. Conventionally, these methods of preparing polyvinyl alcohol have involved the hydrolysis or alcoholysis of polymerized derivatives of vinyl alcohol. Berg, (U. S. P. 2,227,997), (Can. 395,216), (G. B. 512,001), disclosed a process for partially or completely converting derivatives of polyvinyl alcohol to polyvinyl alcohol, the process involving mixing a solid polyvinyl alcohol derivative with a lower aliphatic alcohol and alkaline catalyst, with or without added inert solvent, to form a plastic mass, and mechanically working the plastic mass until it reacted to form a slurry of polyvinyl alcohol in a mixture of unreacted alcohol, inert solvent-diluent and ester, acetal, or ether formed in the alcoholysis.

The Berg process requires the use of special heavy-duty mixing machinery for working the plastic mass formed in the intermediate stage of the process, and the method does not lend itself to adaptation to continuous operation.

The inert diluents used by Berg are all solvents for the polyvinyl alcohol derivative being converted. The alcohols used for the alcoholysis are also solvents for the polyvinyl alcohol derivative being converted. Thus the reacting mass of the Berg process becomes a single phase system and remains as such until the polyvinyl alcohol derivative is partially converted. During the reaction the plastic, doughy mass is difficult and awkward to handle and control.

The invention

It has been discovered that polyvinyl esters of lower aliphatic carboxylic acids, for example polyvinyl acetate and polyvinyl propionate, may be converted to polyvinyl alcohol, ester content less than 5%, by catalytically reacting the polyvinyl esters in the form of small solid particles, with methyl alcohol and alkali catalyst in the presence of a chemically non-reactive liquid that is a non-solvent for polyvinyl alcohol and a non-solvent or a very poor solvent for the polyvinyl esters, but is at least partially miscible with the methyl alcohol. The non-solvent or poor solvent of polyvinyl ester in admixture with the solvent alcohol creates a liquid system in which the rate of solution of polyvinyl ester is less than the rate of alcoholysis caused by alkali catalyst. (The non-solvent or poor solvent of polyvinyl ester is referred to throughout the specification and claims as a solvent modifier.) The total system is never reduced to a single phase, and stirring is required to maintain maximum contact and adequate rate of reaction between the liquid and solid phases. The major part of the system is liquid, with the solids, in finely divided form, suspended in the liquid. The reaction between polyvinyl ester and methyl alcohol starts at the solid-liquid interface. The methyl alcohol, being a solvent for polyvinyl ester, penetrates and softens the particles of polyvinyl ester. By maintenance of a sufficient concentration of catalyst in the liquid phase, the catalyst is able to penetrate the softened particles of polyvinyl ester, and the polyvinyl ester is converted to polyvinyl alcohol before there is any appreciable solution of the polyvinyl ester in the liquid alcohol. The softened particles of polyvinyl ester are thus converted to particles of polyvinyl alcohol without losing their identity as a solid phase.

The reaction product, polyvinyl alcohol, is obtained in the form of a white powder which remains suspended in the liquid mass. It is easily separated from the liquid phase in which it is formed, by filtering, centrifuging, or any other suitable process for separating solid from liquid, and is easily washed free of catalyst residue. The solid polyvinyl alcohol may be freed of the last traces of liquid by drying it in a current of warm air or a vacuum drier or by other suitable means.

The invention may be practised as a batch process or a continuous process. Charges of polyvinyl ester of a lower aliphatic carboxylic acid may be subjected to alcoholysis in batches, the size of the batches depending on the capacity of the reaction vessel used. A polyvinyl ester of a lower aliphatic carboxylic acid may also be fed continuously to a reaction vessel, along with methyl alcohol, catalyst, and a solvent modifier, as described, and the reaction product, polyvinyl alcohol, withdrawn continuously from the reaction vessel as a slurry of polyvinyl alcohol in solvent modifier, by-product ester formed in the reaction, and unreacted alcohol. The continuous method of production is preferred because of the inherent savings obtained by continuous operation.

Suitable solvent modifiers

As solvent modifiers, colorless hydrocarbon fractions of petroleum, preferably with maximum boiling point less than about 200° C., coal-tar naphthas from which the benzene and toluene fraction has been removed, or oil of turpentine, may be used. These are the cheapest and most readily available liquids for use as the solvent modifier, and are therefore preferred and recommended. However, any non-reactive liquid that is at least partially miscible with methyl alcohol, is a non-solvent or an inappreciable solvent, at the temperature of reaction, for polyvinyl alcohol and the polyvinyl ester to be converted, and can easily be separated from polyvinyl alcohol by washing and/or drying operations, may be used as the solvent modifier.

Suitable catalysts

The catalysts suitable for this process are the alkaline catalysts normally used as hydrolysis or alcoholysis catalysts, for example sodium hydroxide, potassium hydroxide, or sodium or potassium alcoholates, particularly the methylates. The catalyst is most conveniently added to the reactants as a solution of the alkali in the methyl alcohol. The amounts of catalyst required are quite small, and the alkali remains in solution during the reaction. Most of the catalyst is removed from the product polyvinyl alcohol with the bulk of the liquid. Hence only a small percentage of the originally small amounts of alkali used are left to contaminate the product polyvinyl alcohol. Because of some saponification, by the alkali, of by-product ester produced, there is usually also some contaminating alkali salt. The contaminating salt and alkali are easily removed by washing the product with a suitable solvent, such as methanol, which dissolves and removes the salt and alkali but does not exert solvent action on the polyvinyl alcohol.

Proportions of ingredients

The relative proportions of polyvinyl ester, alcohol, and solvent modifier used may vary over a considerable range, the range depending upon the specific polyvinyl ester and solvent modifier used. The ratio of methyl alcohol to solvent modifier may vary from a very high value, for example, about 20, to a value less than unity, for example, about 0.2, and preferably has a value in the range between 4.0 and 0.6.

The accompanying diagram, Figure 1, shows the preferred range of relative proportions of methanol, methyl acetate, and a colorless petroleum fraction, suitable as the liquid mixture for alcoholysis of polyvinyl acetate with methanol using 5% potassium hydroxide catalyst, based by weight on the polyvinyl acetate. The petroleum fraction is a straight-run petroleum hydrocarbon fraction distilling between about 43° C. and about 147° C. and having a specific gravity of about 0.71, and is sold in Canada by Imperial Oil Co. Ltd. under the trade name "Iosol 1927." Methyl acetate is not normally added as such to the alcoholysis mixture, but is produced by the reaction between polyvinyl acetate and methanol. The proportions of methyl acetate allowable place the limits on the amounts of polyvinyl acetate that can be converted easily by mixtures containing various relative proportions of alcohol and petroleum fraction. The shaded area on the triangular diagram indicates approximately the allowable proportions of the three liquids in preferred reaction mixtures. The doubly shaded area in Figure 1 indicates suitable working proportions of the three aforementioned liquids in a reaction mixture when the amount of catalyst used is 3% potassium hydroxide by weight on the polyvinyl acetate being reacted. As would be expected, this area is smaller than, and included in, the area indicating suitable working proportions when 5% potassium hydroxide catalyst is used. Satisfactory operation has also been obtained using amounts of catalyst as low as 1½% potassium hydroxide, based on the polyvinyl acetate being reacted. However, the satisfactory working range of relative proportions becomes much smaller, as would be expected, when smaller amounts of catalyst are used. The binodal curves on the diagram show approximately the limits of the proportions of the three liquids which form a two-phase liquid system at 25° C.

The limit to the amount of polyvinyl ester that may be converted by any given quantity of alcohol, or rather any given quantity of alcohol and solvent modifier, according to this process, is not set by the theoretical equivalent of polyvinyl ester that can be converted by reaction with the alcohol, but rather by the practical limitation that the reacting mass must be maintained in the form of a slurry of solids suspended in liquid. The process of this invention requires the addition, to the reaction, of somewhat more than the theoretical amount of alcohol, but since the excess alcohol can be recovered from the products of reaction, there is actually only the theoretical amount consumed. Thus the excess alcohol required for the reaction acts merely as a carrier, and can be recycled.

Theoretically, 86 lbs. of polyvinyl acetate require 32 lbs. of methanol for complete conversion to polyvinyl alcohol. It has been determined by experiments that, by the process of this invention, using the aforementioned petroleum fraction as the solvent modifier, at least 64 lbs. of methanol, as well as solvent modifier, are required for reaction with 86 lbs. of polyvinyl acetate under conditions requiring only conventional methods of stirring. Thus at least a 100% excess of alcohol is required for one particular set of ingredients, but the excess is recoverable and can be recycled.

The extent of the excesses of alcohol required for other systems utilizing the process of this invention will vary. They will be determined by the maximum permissible viscosity of the reacting slurry which conventional stirring means can agitate effectively.

Larger amounts of polyvinyl ester can be converted by alcoholysis to polyvinyl alcohol with any given amount of solvent modifier and alcohol in suitable ratio, if more powerful stirring action is provided. The stirring action must be sufficiently vigorous to maintain intimate contact between, and mixing of, the solid and liquid phases. Normally it is desirable to have a reaction mixture of such consistency that it can flow freely and does not require special types of mixing devices.

Figure 2:
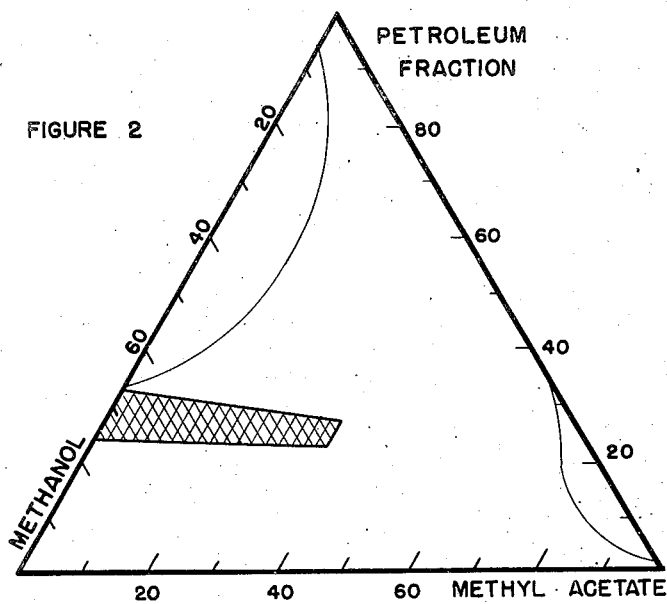

Water has a serious inhibiting effect on the function of the alcoholysis mixtures of this invention. Besides inhibiting the efficiency of the catalyst, water causes undesirable agglomeration of the product into hard lumps which cannot be readily handled; it also interferes with the action of the solvent modifier. The deleterious effects of water are illustrated by the contraction in size of the area which represents the compositions of suitable alcoholysis mixtures containing various proportions of methyl acetate, methanol and the aforementioned petroleum fraction. The shaded area of Figure 2 indicates approximately the range of relative proportions of methanol, methyl acetate, and petroleum fraction suitable for alcoholysis of polyvinyl acetate, using 5% potassium hydroxide catalyst, by weight of the polyvinyl acetate, and with 1% by volume of water in the alcoholysis mixture. When alkali alcoholates are used as catalysts, more water can be tolerated in the system than when alkali hydroxides are used as catalysts, since the alcoholates can react with water to form alkali hydroxides, which continue to exert catalytic effect.

The following examples illustrate specific applications of the invention. It is to be understood that the invention is not limited to the disclosure of the examples, but includes the full scope of the appended claims.

Example 1

This example illustrates a small scale batch preparation of polyvinyl alcohol.

The batch was prepared in a glass kettle of about 1 quart capacity. Stirring during the course of reaction was provided by a small "Lightnin" mixer with a three bladed propeller 1 inch in diameter. 200 cubic centimeters of methanol and 140 ccs. of a petroleum fraction boiling between 43° C. and 147° C. were mixed in the kettle, and to the mixture were added 10 ccs. of catalyst solution consisting of potassium hydroxide dissolved in methanol, 100 grams per litre, and 20 grams of polyvinyl acetate, in the form of beads finer than 14 mesh. (The beads were made by emulsion polymerization of vinyl acetate, and gave a solution of about 500 centipoises viscosity when 86 grams of the beads were dissolved in benzene to form a litre of solution, the viscosity being measured at 20° C.). The contents of the kettle were stirred with the "Lightnin" mixer, and in 10 to 15 minutes the mixture became viscous as the polyvinyl acetate passed through a partially converted, semigelatinous stage, then the mixture became fluid again as the polyvinyl acetate became more completely reacted. When the mixture was again quite fluid, a further 10 ccs. of catalyst solution and 20 grams of polyvinyl acetate beads were added as before, and stirring continued. The cycle was repeated until a total of 120 grams of polyvinyl acetate had been added and reacted beyond the semi-gelatinous stage. In the addition cycles subsequent to the first, the time required for the mixture to pass through the semi-gelatinous stage decreased, and the last two cycles required only about 6 minutes each for completion. The kettle then contained a slurry of polyvinyl alcohol suspended in methyl acetate, unreacted methanol and petroleum fraction. On separation from the liquid, drying, and analysis, the polyvinyl alcohol was found to contain 1.86% residual polyvinyl acetate. The dried product was in the form of a fine white powder, considerably finer in size than the original polyvinyl acetate. It was completely soluble in water and gave a clear aqueous solution.

Example 2

The process outlined in Example 1 was repeated, but with a more dilute catalyst solution containing 60 grams of potassium hydroxide per litre of methanol. The same amounts of methanol, solvent modifier, catalyst solution, and polyvinyl acetate were used, the amount of catalyst being 3% by weight of the polyvinyl acetate used. The alcoholysis product was found, on analysis, to contain 1.45% residual polyvinyl acetate. It was completely water soluble and formed a clear aqueous solution.

Example 3

The procedure of Example 1 was repeated, but with a still more dilute catalyst solution, such that the amount of catalyst used was 1½% by weight of the polyvinyl acetate treated. The catalyst solution contained 30 grams of potassium hydroxide per litre of methanol. The alcoholysis product was found to contain 3.90% residual polyvinyl acetate. It was water soluble but its aqueous solution was hazy, instead of clear like the more completely converted material obtained in the previous examples.

Example 4

The procedure used in the above examples was repeated on a larger scale. A kettle having a 20 gallon capacity was used as the reaction vessel, and stirring was provided by a 3 bladed propeller driven by a ¼ H. P. motor. The batch was started with 18 litres of methanol and 16 litres of the same petroleum fraction as previously used in the kettle, and a litre of methanol catalyst solution containing 80 grams of potassium hydroxide, and 2 kilograms of polyvinyl acetate in the form of beads, of the same quality as used in the preceding examples, were added. Stirring was continued until the mixture had passed through a viscous stage and had become fluid again. Then a further charge of 2 kilograms of polyvinyl acetate and 1 litre of catalyst solution was added and the cycle repeated. Further similar additions were made until 12 kilograms of polyvinyl acetate had been treated using 4% potassium hydroxide by weight on the polyvinyl acetate. The product was filtered from the liquid medium and dried. It was a fine white powder, completely water soluble, and had less than 2% residual polyvinyl acetate content. The time required for the alcoholysis in this batch operation was about 50 minutes.

Example 5

The procedure of Example 4 was repeated with a more dilute catalyst solution, so that the total amount of potassium hydroxide was 2% by weight of the polyvinyl acetate treated. 12 kilograms of polyvinyl acetate were converted to polyvinyl alcohol with a residual polyvinyl acetate content of less than 2%. The product was completely water soluble and gave a clear aqueous solution. The time required for the alcoholysis was slightly longer than the time required in the previous example.

The following examples illustrate the operation of the invention in a continuous process on a pilot-plant scale.

The raw materials used were polyvinyl acetate of the same grade as used in the previous examples, commercial grade methanol, and a petroleum fraction of the same grade as used in the previous examples. The catalyst used was potassium hydroxide dissolved in methanol, the effective amount of potassium hydroxide catalyst used being about 5% by weight of the polyvinyl acetate being treated.

The process was carried out in a series of kettles equipped with efficient high-speed stirring devices. The first two kettles were 20 gallon kettles, arranged side by side with a 6" diameter opening connecting the two, adjacent the bottom. Reactants fed to the top of the first kettle passed through this opening and out of the second kettle through an overflow into a third kettle of 25 gallon capacity. From this third kettle the charge was allowed to overflow into a fourth kettle of 60 gallon capacity, which acted as an accumulator. From the accumulator the completely reacted charge was fed to a centrifuge in batches.

*Example 6*

This particular example is a continuous run made in the above described apparatus. The run lasted about 100 hours. 4050 lbs. of polyvinyl acetate, in the form of fine beads, were fed continuously by a screw feeder to the first kettle. 7250 lbs. of methanol, containing dissolved potassium hydroxide catalyst, and 5800 lbs. of the petroleum fraction were also added continuously to the first kettle with the polyvinyl acetate. The amount of catalyst used was about 5% by weight of the amount of polyvinyl acetate. High speed stirring in the first and second kettles maintained the solids suspended, and the polyvinyl acetate readily underwent alcoholysis. Since the polyvinyl acetate was being added slowly and continuously, there was never a large amount of polyvinyl acetate in a semi-gelatinous, partially-reacted state in the kettles. Hence the material in the kettles was always in a fluid, free-flowing condition, and the system did not have to pass through the viscous, semi-gelatinous stage. As the charge travelled through the third kettle, where it was again subject to high-speed stirring, the reaction was completed, the capacity of the third kettle permitting sufficient hold-up time to ensure that the ingredients had reacted completely, before overflowing to the fourth kettle.

The charge was accumulated into batches in the fourth kettle, and fed batchwise to a centrifuge where the liquid part of the charge was spun out of the solid product, and the product washed with methanol to remove residual catalyst and alkali salt. After centrifuging, the product was dried for about a half hour on trays in a stream of nitrogen in an oven at about 70° C.

2000 lbs. of white, finely divided polyvinyl alcohol were obtained from this run. The product had less than 3% volatiles and less than 1% residual polyvinyl acetate. It was completely water-soluble and gave a clear aqueous solution.

*Example 7*

Another continuous run of 32 hours duration was made in the same apparatus used in Example 6. 1800 lbs. of polyvinyl acetate beads were fed continuously during the run to the first kettle, along with 3950 lbs. of methanol and 2890 lbs. of the petroleum fraction. The methanol contained dissolved potassium hydroxide in an amount equivalent to about 5% by weight of the amount of polyvinyl acetate. The charge remained fluid throughout the alcoholysis, and flowed freely through the different kettles of the apparatus.

The solid product was separated by centrifuging, washed with methanol and dried, as described in Example 6. 900 lbs. of dried product were obtained from the run. The product had the same valuable properties as the product obtained in the previous example.

*Example 8*

This example illustrates another small scale batch preparation of polyvinyl alcohol using oil of turpentine as a solvent modifier.

100 ccs. of methanol and 240 ccs. of oil of turpentine were placed in a glass flask, and 10 ccs. of catalyst solution consisting of potassium hydroxide dissolved in methanol, 100 grams per litre, were added to the mixture, then 20 grams of polyvinyl acetate beads were added as the mixture was rapidly stirred with a "Lightnin" mixer. The polyvinyl acetate underwent alcoholysis and a slurry of polyvinyl alcohol was formed, in the same manner as described in Example 1. Five further additions, each of 10 ccs. of catalyst solution and 20 grams of polyvinyl acetate, were made, in the manner described in the procedure of Example 1, then the solid product, polyvinyl alcohol, was filtered from the liquid bulk, washed with methanol, and dried. The product was a white powder containing less than 2% polyvinyl acetate, was completely water soluble and gave a clear aqueous solution.

These examples described the preparation of polyvinyl alcohol by alcoholysis of polyvinyl acetate. However, other polyvinyl esters, such as polyvinyl formate, polyvinyl propionate, and polyvinyl butyrate may be used as the raw material for the preparation of polyvinyl alcohol by the process of this invention, provided the polyvinyl ester is in finely divided form.

The invention provides a means of obtaining, in a simple, economical, and efficacious manner, polyvinyl alcohol containing less than 5% residual polyvinyl ester. Under preferred operating conditions, polyvinyl alcohol containing less than 1%, usually less than 0.5%, polyvinyl ester, can be produced.

The invention also provides a method whereby polyvinyl alcohol, heretofore produced only by awkward batch processes, may be produced by a smooth-running continuous process. The process can be operated in ordinary, inexpensive equipment. The process is most advantageously operated at normal room temperature, and heating or cooling equipment is not required. When the process is operated at temperatures around 40° C., the rate of reaction is not advantageously greater than the rate of reaction at room temperature. When operated at temperatures below room temperature, the rate of reaction decreases to a point where it becomes slower than the rate of solution of polyvinyl ester in the mixture of alcohol and solvent modifier. When this occurs, the mixture becomes viscous and too difficult to handle with ordinary stirring apparatus.

The process of this invention, whereby a polyvinyl ester of a lower aliphatic carboxylic acid is converted to polyvinyl alcohol while the polyvinyl ester, in the form of small solid particles, is dispersed in a liquid medium, is further advantageous in that, in addition to requiring only conventional, inexpensive equipment, the process enables higher production rates to be maintained than can be attained by any other known process in equipment of similar size. Processes involving solution of polyvinyl ester in one or more solvents for alcoholysis would require quantities of solvent varying from at least five times to more than ten times the quantity of polyvinyl ester being converted, the ratio of solvent to polyvinyl ester depending on the viscosity of a standard strength solution of the polyvinyl ester. The higher the viscosity of a standard strength solution of a polyvinyl ester, the greater would be the dilution required for alcoholysis of the ester in solution. The process of the present invention requires the use of quantities of liquid ingredients equal to less than five times, even lower than twice the quantity of polyvinyl ester being converted, and of this quantity of liquid ingredients, a major proportion may be inexpensive liquid solvent modifier having the characteristics previously outlined.

The liquid recovered from the hydrolysis of polyvinyl esters by the process of this invention, is a mixture of unreacted methyl alcohol, solvent modifier, and ester formed by metathesis between the polyvinyl ester and methyl alcohol. These may be separated by any suitable means, for instance distillation, combined extraction and distillation, or combined saponification with aqueous caustic, decantation, and distillation. Since the solvent modifier used may be one of the inexpensive, readily available materials previously mentioned, the cost involved in solvent losses is a minimum. Alcohol recovered from the liquid bulk can be recycled for further alcoholysis of polyvinyl acetate. Ester recovered from the liquid bulk can be disposed of as such or converted to alcohol by saponification and used for further alcoholysis. Solvent modifier recovered from the liquid bulk can be recycled through the process without further treatment.

The polyvinyl alcohol obtained by the process of this invention contains only a small percentage, as low as a fraction of 1%, of polyvinyl ester from which the polyvinyl alcohol is made. The amount of ash left on ignition of the polyvinyl alcohol is also a small percentage.

The viscosity of standard solutions of the polyvinyl alcohol depends partially on the nature and state of polymerization of the polyvinyl ester from which the polyvinyl alcohol is hydrolyzed. One standard solution contains 40.4 grams of polyvinyl alcohol dissolved in one litre of distilled water, and the viscosity of this solution is measured at 20° C. The higher the viscosity of this standard solution, the more valuable is the polyvinyl alcohol for certain purposes. Such standard solutions of polyvinyl alcohol produced by the process of this invention, from polyvinyl acetate having a viscosity of 500 centipoises as previously defined, have been found to have viscosities up to 55 centipoises.

I claim:

1. A process for the preparation of polyvinyl alcohol consisting of the alcoholysis, with methanol, of a polyvinyl ester of an unsubstituted lower aliphatic monocarboxylic acid, under vigorous agitation, in the presence of excess methanol, an alkaline alcoholysis catalyst, and a liquid solvent modifier that is at least partially miscible with the methanol and is non-solvent for polyvinyl alcohol, said polyvinyl ester being not more than sparingly soluble in said liquid solvent modifier, the ratio of methanol to liquid solvent modifier being in the range between 20 and 0.2 and in such proportions that the rate of solution of the polyvinyl ester in the mixture of methanol and solvent modifier is less than the rate of alcoholysis of the polyvinyl ester, and polyvinyl alcohol being insoluble in the mixture.

2. A process, according to claim 1, in which the polyvinyl ester is polyvinyl acetate.

3. A process, according to claim 2, in which the liquid solvent modifier is a non-solvent for the polyvinyl acetate.

4. A process, according to claim 3, in which the liquid solvent modifier is a colorless petroleum distillate fraction.

5. A process, according to claim 17, in which the ratio of methanol to liquid solvent modifier is in the range between 4.0 and 0.6.

6. A process for the preparation of polyvinyl alcohol comprising (a) forming a mixture of methanol, alkaline alcoholysis catalyst, and a solvent modifier that is a liquid which is chemically non-reactive, a non-solvent for polyvinyl alcohol and an inappreciable solvent for polyvinyl esters of unsubstituted lower aliphatic mono-carboxylic acids, but is at least partially miscible with methanol, the ratio of methanol to liquid solvent modifier being in the range between 20 and 0.2 and in such proportions that the rate of solution of the polyvinyl ester in the mixture of methanol and solvent modifier is less than the rate of alcoholysis of the polyvinyl ester, and polyvinyl alcohol being insoluble in the mixture, (b) adding successive portions of alkaline alcoholysis catalyst dissolved in methanol and of a polyvinyl ester of an unsubstituted lower aliphatic mono-carboxylic acid in the form of finely divided solid particles, (c) continuously and vigorously agitating the mixture to maintain the solid particles suspended in the liquids, until a slurry of polyvinyl alcohol suspended in liquid is formed, (d) continuing the additions and agitation until an amount of polyvinyl ester equivalent to not more than half of the methanol present has been added, and (e) recovering the polyvinyl alcohol from the mixture.

7. A process, according to claim 6, in which the polyvinyl ester is polyvinyl acetate.

8. A process, according to claim 7, in which the liquid solvent modifier is a colorless petroleum distillate fraction.

9. A process, according to claim 15, in which the ratio of methanol to solvent modifier is in the range between 4.0 and 0.6.

10. A process for the preparation of polyvinyl alcohol comprising (a) continuously adding to a reaction vessel a polyvinyl ester of an unsubstituted lower aliphatic mono-carboxylic acid in the form of small solid particles, methanol, alkaline alcoholysis catalyst, and a solvent modifier that is a liquid which is chemically non-reactive, a non-solvent for polyvinyl alcohol, and an inappreciable solvent for the polyvinyl ester, but at least partly miscible with methanol, the rate of addition of methanol being such that at least two chemical equivalents of methanol are added to each chemical equivalent of polyvinyl ester, the ratio of methanol to liquid solvent modifier being in the range between 20 and 0.2 and in such proportions that the rate of solution of the polyvinyl ester in the mixture of methanol and solvent modifier is less than the rate of alcoholysis of the polyvinyl ester, and polyvinyl alcohol being insoluble in the mixture, (b) continuously and vigorously stirring the contents of the vessel to form an intimate mixture, (c) continuously withdrawing the mixture from the reaction vessel, (d) stirring the withdrawn material until the solid particles are substantially completely converted to polyvinyl alcohol, and (e) recovering the polyvinyl alcohol from the other constituents.

11. A process, according to claim 10, in which the polyvinyl ester is polyvinyl acetate.

12. A process, according to claim 11, in which the liquid solvent modifier is a colorless petroleum distillate fraction.

13. A process, according to claim 16, in which the ratio of the rates of addition of methanol and solvent modifier is in the range between 4.0 and 0.6.

14. A process, according to claim 4, in which the catalyst is an alkali alcoholate.

15. A process according to claim 8, in which the catalyst is an alkali alcoholate.

16. A process according to claim 12, in which the catalyst is an alkali alcoholate.

17. A process according to claim 1, in which the liquid solvent modifier is oil of turpentine.

18. A process according to claim 1, in which the catalyst is an alkali metal hydroxide.

LEO M. GERMAIN.

REFERENCES CITED

The following references are of record in the file of this patent:

UNITED STATES PATENTS

| Number | Name | Date |
|---|---|---|
| 2,109,883 | Hermann | Mar. 1, 1938 |
| 2,227,997 | Berg | Jan. 7, 1941 |
| 2,387,833 | Dahle | Oct. 30, 1945 |

FOREIGN PATENTS

| Number | Country | Date |
|---|---|---|
| 565,633 | Germany | Nov. 4, 1930 |